May 27, 1930.  E. G. STRECKFUSS  1,760,669
MEAT CLAMP
Filed March 20, 1926
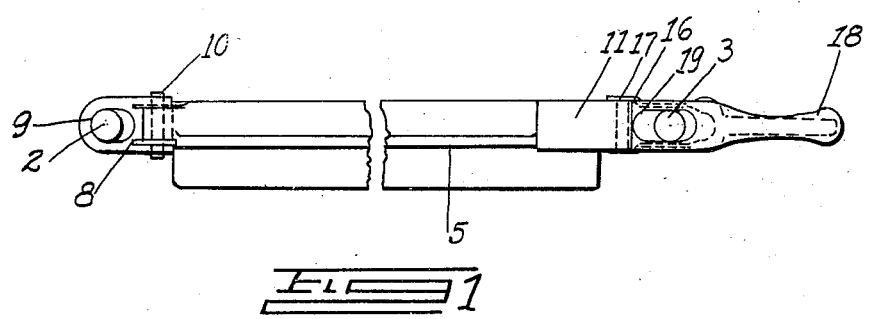
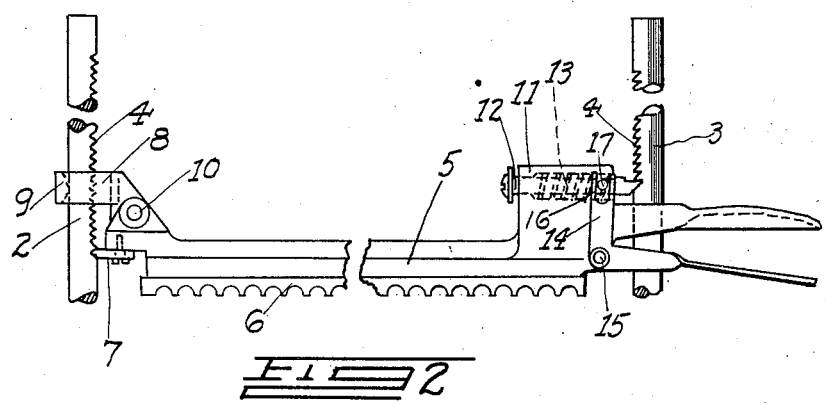
INVENTOR.
Elmer G. Streckfuss
BY
ATTORNEY.

Patented May 27, 1930

1,760,669

UNITED STATES PATENT OFFICE

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO

MEAT CLAMP

Application filed March 20, 1926. Serial No. 96,297.

My invention relates to meat clamps for use in connection with the securing of a piece of meat upon the advancing table of a meat slicing machine.

It has as its object the provision of a device which is simple to operate from one end thereof, and can be very tightly clamped against a piece of meat, using leverage in the application of force.

To this end I have provided a device which is pivotally secured to the supporting post, opposite to the one where the operator grasps the operating handle, and have so arranged the several parts that a natural mode of operation will give a strong and fixed grasp of a piece of meat.

I accomplish my object by that certain construction and arrangement of parts to be hereinafter more specifically pointed out and claimed.

In the drawing:

Figure 1 is a plan view of the device.

Figure 2 is a side elevation thereof.

I have not shown a meat plate, since such a structure is well known and can be in many forms. The fixed supporting posts 2 and 3, shown in the drawing will be supported in conjunction with whatever plate is provided, and move with it toward a slicing knife.

The posts have teeth 4, which are sharp pointed so as to avoid a catching of the latching dogs on the crests thereof.

The clamp bar 5 is formed with the usual teeth 6 for gripping the meat, and at one end is provided with a single toothed dog 7, for engaging the teeth in the rod 2.

A loop 8 with an aperture which is longer than the cross section of the rod 2, and terminates in a curved wall 9, engages over the rod 2, and is pivoted to the clamp bar at 10.

The other end of the clamp bar is integral with a housing 11, in which is a plunger 12, urger outwardly by a spring 13. This plunger has a toothed end serving as a dog for engaging the teeth of the rod 3.

A bell crank lever 14 is pivoted at 15 to the clamp bar, and has a forked end 16, which engages a stud 17 on the spring plunger. By pressing upwardly on the outer end of the lever, the dog at the end of the plunger will be withdrawn from the teeth of the rod 3.

A fixed handle or grip 18 extends from the housing on the clamp bar, and has an intermediate portion with a slot 19 to surround the rod 3. The slot is longer than the cross section of the rod 3.

It will be noted that the loop 8 and the handle 18, serve to hold the meat clamp on the two rods, but permit the clamp to be reciprocated with relation to the rods, and hence tipped to angles in the same plane as the two rods. The slots in the parts 8 and 18 are of the same width as the rods, but longer than the rods as shown best in Figure 1.

Presupposing a piece of meat below the clamp bar, the operator will grasp the handle 18, pressing upwardly on the lever 14 at the same time, and pulling the meat bar slightly toward the rod 3. He can then lower the meat bar onto the meat by forcing the end away from the handle down first, and holding up the end where the handle is located. The bar will rock easily on the rod 2 when held at the slanting position noted, so as to lift out the dog 7. When the bar contacts with the meat, which it will do first at the part toward the low end the operator rocks the bar towards horizontal position, releasing the bell crank lever 14.

This brings the dog into contact with the teeth of rod 2, and the dog or pawl at the end of the spring plunger will ride down over the teeth of the rod 3. When the meat is tightly clamped in this way, the bell crank lever being fully released, the pawl will engage the adjacent tooth of the rod 3 and hold the meat in tightly clamped position.

It is evident that the operator need use but one hand, in the practice described, and that he can get a considerable leverage.

Also if the meat gets loose he can rock the spring pawl end of the meat clamp down further, without disturbing the engagement at the fixed dog end of the bar.

In raising the meat clamp, the operator grips the handle, pulling up the bell crank lever, whereupon he will be free to rock the meat clamp upwardly at the handle end, and when the dog has been lifted out of the teeth of the rod 2 by this manipulation, the meat clamp can be readily slid upwardly on the two rods, keeping the slanting position thereof.

The movements above described are the natural ones which an operator would make in attempting to push down a clamp bar on a piece of meat from one end, so that no particular instruction is called for in the use of the device.

It is evident that modifications of the particular mechanisms described for accomplishing my objects could be made without departing from the spirit of my invention, which I will define in the claims.

Having thus described my invention, what I claim as new and desire to secure by Letters Patent, is:

1. In a meat clamp, the combination with a pair of fixed vertical rack bars, a clamp bar, means on the clamp bar surrounding said rack bars and slidable thereon, said clamp bar being pivotally connected to one of said means, and means on the clamp bar at the said pivotally connected end for engaging the adjacent rack bar to hold the clamp bar against movement, said clamp bar having position adjusting means actuative with one hand, the movement of which in one direction is effective for regulating the position of said clamp bar relative to both rack bars.

2. In a meat clamp, the combination with a pair of fixed vertical rack bars, a clamp bar, means on the clamp bar surrounding said rack bars and slidable thereon, said clamp bar being pivotally connected to one of said means, and means on the clamp bar at the said pivotally connected end for engaging the adjacent rack bar to hold the clamp bar against movement, said means comprising a dog on the clamp bar to engage the teeth of said rack bar, said clamp bar having position adjusting means actuative with one hand, the movement of which in one direction is effective for regulating the position of said clamp bar relative to both rack bars.

3. In a meat clamp, the combination with a pair of fixed vertical rack bars, a clamp bar, means on the clamp bar surrounding said rack bars and slidable thereon, said clamp bar being pivotally connected to one of said means, and means on the clamp bar at the said pivotally connected end for engaging the adjacent rack bar to hold the clamp bar against movement, and manually releasable means rigid as distinguished from pivotal with the bar for engaging the other of said rack bars, said clamp bar having position adjusting means actuative with one hand, the movement of which in one direction is effective for regulating the position of said clamp bar relative to both rack bars.

4. In a meat clamp, a pair of rigid vertical bars having teeth facing each other, a clamp bar, a fixed dog on the clamp to engage the teeth on one vertical bar, a sliding element on said vertical bar and pivoted to the clamp bar, and means rigid as distinguished from pivotal with the other end of the clamp bar, to slidably engage the other vertical bar, said clamp bar having position adjusting means actuative with one hand, the movement of which in one direction is effective for regulating the position of said clamp bar relative to both rack bars.

5. In a meat clamp, a pair of rigid vertical bars having teeth facing each other, a clamp bar, a fixed dog on the clamp to engage the teeth on one vertical bar, a sliding element on said vertical bar, and pivoted to the clamp bar, and means fixedly connected to the other end of the clamp bar, to slidably engage the other vertical bar, a spring pawl on the bar to engage the teeth of the other vertical bar, and means for manually releasing said pawl, said clamp bar having position adjusting means actuative with one hand, the movement of which in one direction is effective for regulating the position of said clamp bar relative to both rack bars.

6. In a meat clamp, the combination with a pair of fixed vertical rack bars, a clamp bar having pivotal connection with but one of the rack bars and sliding connection with both of the rack bars, and means operable by the tilting of the clamp bar on its pivotal connection for holding the bar against sliding on the one rack bar, said clamp bar having position adjusting means actuative with one hand, the movement of which in one direction is effective for regulating the position of said clamp bar relative to both rack bars.

7. In a meat clamp, the combination with a pair of fixed vertical rack bars, a clamp bar having pivotal connection with but one of the rack bars, and sliding connection with both of the rack bars, and means operable by the tilting of the clamp bar on its pivotal connection for holding the bar against sliding on the one said rack bar, and a manually controlled means on the other rack bar arranged to normally permit movement of the clamp bar downwardly on said support, but not upwardly, for the purpose described, said clamp bar having position adjusting means actuative with one hand, the movement of which in one direction is effective for regulating the position of said clamp bar relative to both rack bars.

ELMER G. STRECKFUSS.